(12) United States Patent
Touse et al.

(10) Patent No.: US 10,690,048 B2
(45) Date of Patent: Jun. 23, 2020

(54) BOLT FASTENING METHOD FOR LOWER LINK

(71) Applicant: NISSAN MOTOR CO., LTD., Yokohama-shi, Kanagawa (JP)

(72) Inventors: Mitsuo Touse, Kanagawa (JP); Yoshihiro Kobayashi, Kanagawa (JP); Shigeru Nakajima, Kanagawa (JP); Kazuhiko Takashima, Kanagawa (JP); Kazuto Waki, Kanagawa (JP); Daisuke Watanabe, Kanagawa (JP); Takeshi Chihara, Kanagawa (JP); Kousuke Inoue, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 64 days.

(21) Appl. No.: 15/759,637

(22) PCT Filed: Sep. 16, 2015

(86) PCT No.: PCT/JP2015/076227
§ 371 (c)(1),
(2) Date: Mar. 13, 2018

(87) PCT Pub. No.: WO2017/046878
PCT Pub. Date: Mar. 23, 2017

(65) Prior Publication Data
US 2018/0252156 A1 Sep. 6, 2018

(51) Int. Cl.
*B23P 19/06* (2006.01)
*F02B 75/32* (2006.01)
*F02B 75/04* (2006.01)

(52) U.S. Cl.
CPC ............ *F02B 75/045* (2013.01); *B23P 19/06* (2013.01); *F02B 75/32* (2013.01)

(58) Field of Classification Search
CPC ........ F02B 75/045; F02B 75/32; F02B 75/04; F02B 75/048; F16C 3/06; F16C 7/00; F16C 2226/00; F16C 2226/62; B23P 19/06
See application file for complete search history.

(56) References Cited

U.S. PATENT DOCUMENTS

2004/0112169 A1* 6/2004 Hiyoshi ................ F02B 75/048
74/579 R
2005/0045120 A1 3/2005 Moteki et al.
(Continued)

FOREIGN PATENT DOCUMENTS

JP 10-113831 A 5/1998
JP 2005-69270 A 3/2005
(Continued)

OTHER PUBLICATIONS

LS Engine DIY, "LS Engine Rebuilds: Final Assembly Guide", pp. 1-80, Apr. 18, 2015 (Year: 2015).*

*Primary Examiner* — Lee A Holly
(74) *Attorney, Agent, or Firm* — Foley & Lardner LLP (57) ABSTRACT

A jig (31) is placed on a cylinder block (11) set in an inverted position, and a crankshaft (5) is lifted upward from a main bearing part (17) and held at a predetermined height position. A lower link (7) temporarily fitted to a crank pin (6) in the previous step is rotated about the crank pin (6) as a center by a robot hand, and held in a predetermined inclined position in which a dividing surface (28) becomes vertical. In this state, a pair of bolts (29) is horizontally fastened from the right and the left by using a nut runner (55).

11 Claims, 6 Drawing Sheets

(56) References Cited

U.S. PATENT DOCUMENTS

| | | | |
|---|---|---|---|
| 2009/0041398 A1* | 2/2009 | Tanaka | F02B 75/048 384/429 |
| 2009/0107468 A1* | 4/2009 | Takahashi | F02B 75/048 123/48 B |
| 2017/0254260 A1* | 9/2017 | Yamada | F02B 75/04 |

FOREIGN PATENT DOCUMENTS

| | | |
|---|---|---|
| JP | 2005-180657 A | 7/2005 |
| JP | 2008-208783 A | 9/2008 |
| JP | 2010-7620 A | 1/2010 |

* cited by examiner

BOLT FASTENING METHOD FOR LOWER LINK

TECHNICAL FIELD

This invention relates to a bolt fastening method for lower links in an internal combustion engine provided with a multi-link-type piston crank mechanism including upper links, lower links and control links, and specifically relates to a bolt fastening method for lower links, method in which each of the lower links configured by being divided into two parts of a lower link lower and a lower link upper is attached so as to sandwich a corresponding one of crank pins and a pair of bolts of each of the lower links is fastened from directions opposite to each other, and then fixed.

BACKGROUND TECHNOLOGY

As a related art in which a multi-link-type piston crank mechanism connects between a piston pin and a crank pin of a reciprocating internal combustion engine, a patent document 1 previously suggested by the present applicant has been commonly known. This includes an upper link connected to a piston pin of a piston, a lower link connecting the upper link with a crank pin of a crankshaft and a control link whose one end is swingably supported at an engine body side and the other end is connected to the lower link. The upper link and the lower link are rotatably connected to each other via an upper pin, and the control link and the lower link are rotatably connected to each other via a control pin.

Here, to realize the attachment of the lower link to the crank pin, the lower link is configured by dividing it into two parts of a lower link upper with which the upper link is connected and a lower link lower with which the control link is connected. These lower link upper and lower link lower are combined so as to sandwich the crank pin, and as shown in a patent document 2, they are fastened to each other by a pair of bolts inserted from directions opposite to each other.

In a case of a general single-link-type piston crank mechanism as a piston crank mechanism in a reciprocating internal combustion engine, the large end part of a connecting rod whose small end part is connected to a piston is divided into a main body part and a cap part, and a crank pin is sandwiched, and they are fastened to each other by a pair of bolts arranged parallel to each other.

This fastening for the bolts, that is, the assembling of the connecting rod and a crankshaft is generally carried out in a state in which a cylinder block is inverted and a crank case is directed upward. That is, the main body part of the connecting rod is connected with the piston in advance, and after each piston is inserted into a corresponding one of cylinders, the crankshaft is placed on main bearing parts of the cylinder block set in an inverted position, and cap portions are placed on respective crank pins of the crankshaft, and then the fastening with the main body parts protruding upward from the respective cylinders is carried out. A pair of the bolts is inserted and disposed parallel to each other, and then fastened by a nut runner.

For example, in an in-line four-cylinder internal combustion engine, the crank pins of #1 and #4 cylinder sections are disposed at positions different in phases by 180° from the crank pins of #2 and #3 cylinder sections. However, the fastening of the bolts can be carried out from above with respect to all of the cylinder sections, and basically, the fastening of the bolts of all of the cylinder sections is therefore possible without rotating the crankshaft.

As compared with a case of the single-link-type piston crank mechanism, in the above-mentioned multi-link-type piston crank mechanism, the fastening work of a lower link to a crankshaft (crank pin) becomes quite complicated. The lower link is fastened by bolts arranged parallel to and opposite to each other. Moreover, since there are a plurality of crank pins having different phases, to fit the lower links to the crank pins of all of the cylinder sections in the state in which the cylinder block is set in an inverted position, it is necessary that the positions of the lower links are rotated vertically while the crankshaft is rotated plural times by a predetermined angle each time (for example, 180° each, in an in-line four-cylinder engine), and the fastening of each of the bolts is carried out. Furthermore, a plurality of steps to one bolt is needed for bolt axial force control. For example, steps are carried out from the application of snug torque through returning to torque zero and the application of the snug torque to the angle fastening of a predetermined angle. If each of these steps is alternately carried out to two bolts of each of the lower links, bolts which face opposite to each other, the number of times of the rotation operation of the crankshaft further increases, and, for example, a few tens of the rotation operations are needed.

Therefore, an object of the present invention is to provide a bolt fastening method for lower links with which fastening work of a pair of bolts arranged opposite to each other and fitted to each of the lower links can be easily carried out by using nut runners.

PRIOR ART REFERENCES

Patent Documents

Patent Document 1: Japanese Patent Application Publication 2010-7620
Patent Document 2: Japanese Patent Application Publication 2005-180657

SUMMARY OF THE INVENTION

The present invention is a bolt fastening method for lower links in an internal combustion engine equipped with a multi-link-type piston crank mechanism including upper links, the lower links and control links, wherein each of the lower links which is divided into two parts of a lower link lower and a lower link upper is attached so as to sandwich a corresponding one of crank pins and a pair of bolts of each of the lower links is fastened from directions opposite to each other, and then fixed, the bolt fastening method for the lower links comprising:
holding a cylinder block in an inverted position such that a crank case side faces upward;
temporarily fitting the lower links of respective cylinder sections, the lower links each of which is connected with a corresponding one of pistons via a corresponding one of the upper links in advance, to the respective crank pins of corresponding ones of cylinder sections in a crankshaft in a state in which each of the pistons is fitted into a corresponding one of cylinders;
setting the crankshaft to a state of being lifted to an upper position apart from main baring parts of bulkheads such that all of a plurality of the crank pins having different phases from each other are each set at a position lifted upward from a reference plane surface along end edges of skirt parts of the cylinder block; and
fastening the pair of the bolts of each of the lower links from right and left directions by nut runners in a state in which inclined positions of the lower links of the respective cylinder sections, centering the crank pins, are each held at a position in which heads of the pair of the bolts of each of the lower links are directed to right and left directions.

That is, each of the lower link lowers is in a state of being connected with a corresponding one of the pistons via a corresponding one of the upper links before being fitted to the crankshaft, and in this state, the pistons are inserted into the respective cylinders. The insertion of the pistons into the respective cylinders may be performed before the cylinder block is inverted or may be performed in the inverted position of the cylinder block. In addition, it is optional to insert the pistons from the respective top dead center sides of the cylinders or from the respective bottom dead center sides of the cylinders.

After the insertion of the pistons, the crankshaft is placed on the crank case of the cylinder block set in the inverted position, and the lower links are temporarily fitted to the respective crank pins. Similar to the final bolt fastening by the nut runners, this temporary fitting can be carried out in a state in which the crankshaft is lifted upward. However, it is not always limited to this. In the temporary fitting, the crank pins are placed on the corresponding ones of the lower link uppers protruding from the cylinders, and the lower link lowers are fitted on corresponding ones of the crank pins, and then moderate temporary fastening of the bolts is carried out by, for example, hand. In addition, in the temporary fitting, the temporary fastening of one of the bolts of each of the lower links may be performed, or the temporary fastening of both two bolts may be performed.

In addition, at the time of the final fastening of each of the bolts, the crankshaft is held in a state of being lifted upward apart from the main bearing parts of the bulkheads, and the inclined position of each of the lower links is held such that the heads of a pair of the bolts of each of the lower links are directed in right and left directions. As mentioned above, it is also possible that the crankshaft is held in a state of being lifted upward before the temporary fitting of the lower links. The position of the crankshaft at this time is set at least at a position in which all of the crank pins having different phases are above the reference plane surface along the end edges of the skirt parts. Accordingly, the lower links temporarily fitted to the respective crank pins are set to the proper inclined position in which the bolt heads are directed in the right and left directions, and thereby the fastening of the bolts from the right and left directions by the nut runners becomes possible without the rotation operation of the crankshaft.

In addition, the degree of the height position of the lifted crankshaft is defined on the basis of whether or not the extended line extending from the central axis of each of the bolts to a bolt head part side interferes with the skirt parts, and at least, a height is required at which the extended line does not interfere with the skirt parts. More specifically, in consideration of the external dimension of each of the nut runners, a height is required at which the fastening of the bolts can be carried out without the interference of the nut runners with the skirt parts.

Therefore, according to the present invention, in the lower links which are fitted to a plurality of the respective crank pins having different phases, it is possible to fasten a pair of the bolts of each of the lower links, which is arranged opposite to each other, without requiring the rotation operation of the crankshaft, and thereby it is possible to perform the assembling of the multi-link-type piston crank mechanism more efficiently.

MODE FOR IMPLEMENTING THE INVENTION

In the following, one embodiment of the present invention will be explained in detail based on the drawings.

Figure 1:
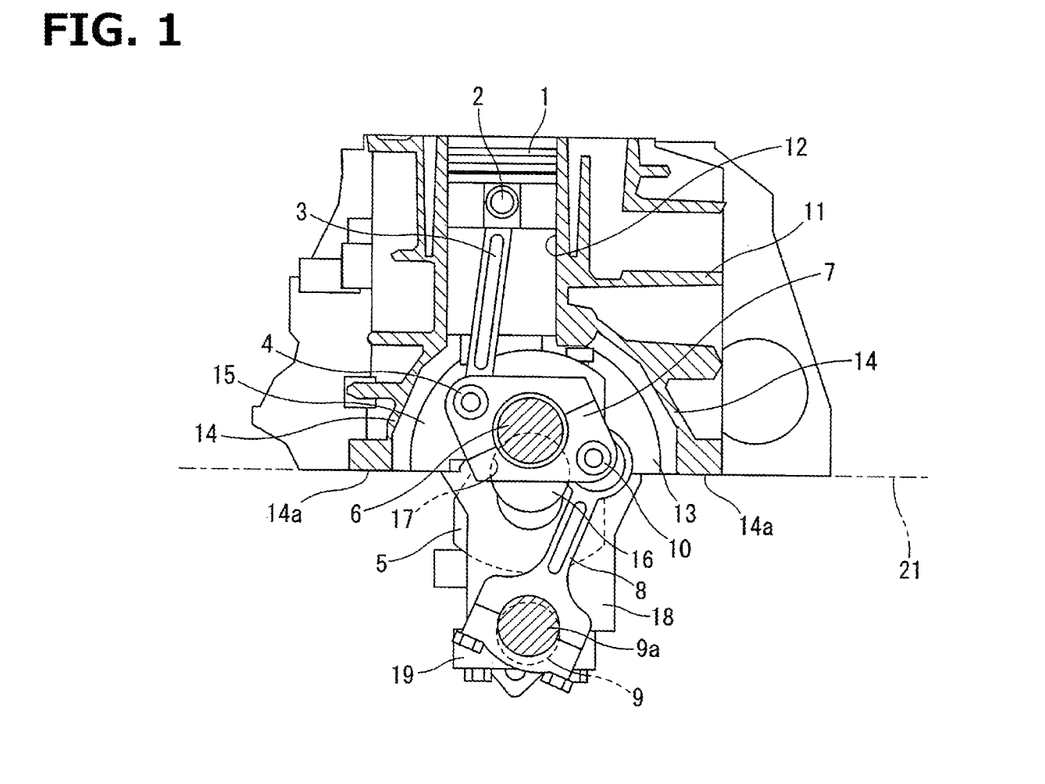
FIG. 1 is a sectional explanation view of an internal combustion engine equipped with a multi-link-type piston crank mechanism.

First, based on FIG. 1, the configuration of an internal combustion engine equipped with a multi-link-type piston crank mechanism that is the object of the present invention will be briefly explained. The multi-link-type piston crank mechanism itself is one which is well-known by the above patent document 1, and includes an upper link 3 whose one end is connected to a piston 1 via a piston pin 2, a lower link 7 connected to the other end of upper link 3 via an upper pin 4 and to a crank pin 6 of a crank shaft 5 and a control link 8 configured to regulate the freedom of lower link 7. One end of control link 8 is swingably supported on an eccentric shaft part 9a of a control shaft 9, and the other end thereof is connected to lower link 7 via a control pin 10. Here, although the embodiment shown in the drawing is configured as a variable compression ratio mechanism in which the top dead center position of piston 1 varies according to the rotation position of control shaft 9, it is possible to be configured to have the structure in which compression ratio does not vary by setting the swing fulcrum of the one end of control link 8 as a fixed fulcrum.

The internal combustion engine shown in the drawing is, for example, an in-line four-cylinder internal combustion engine, and an cylinder block 11 integrally cast with aluminum alloys includes four cylinders 12 arranged in a row, and skirt parts 14 each extending from the lower end part of each of the cylinders 12 toward both right and left sides, such that a crank case 13 is formed under cylinders 12. In addition, main bearing parts 17 on which respective main journals 16 are fitted are recessed in arc shapes in the substantial centers of the lower edges of bulkheads 15, each of which is provided between cylinders 12 and at both front and back ends of cylinders 12. The lower edge of each of bulkheads 15 is attached with a corresponding one of main bearing caps 18, and each of main journals 16 is rotatably supported between a corresponding one of main bearing caps 18 and a corresponding one of main bearing parts 17 attached to the lower edges of main bearing caps 18. Control shaft 9 is rotatably supported between main bearing caps 18 and sub bearing caps 19 attached to the respective lower edges of the main bearing caps 18.

Here, an end edge 14a at the lower end of each of skirt parts 14 is formed along one plane surface, that is, along a reference plane surface 21. In particular, the embodiment shown in the drawing has a so-called half-skirt-type structure configured such that reference plane surface 21 passes through the rotation center of each of main journals 16 of crankshaft 5. End edge 14a of each of skirt parts 14 and the lower edge of each of bulkheads 15 are machined along reference plane surface 21 passing through the rotation center of each of main journals 16.

Figure 2:
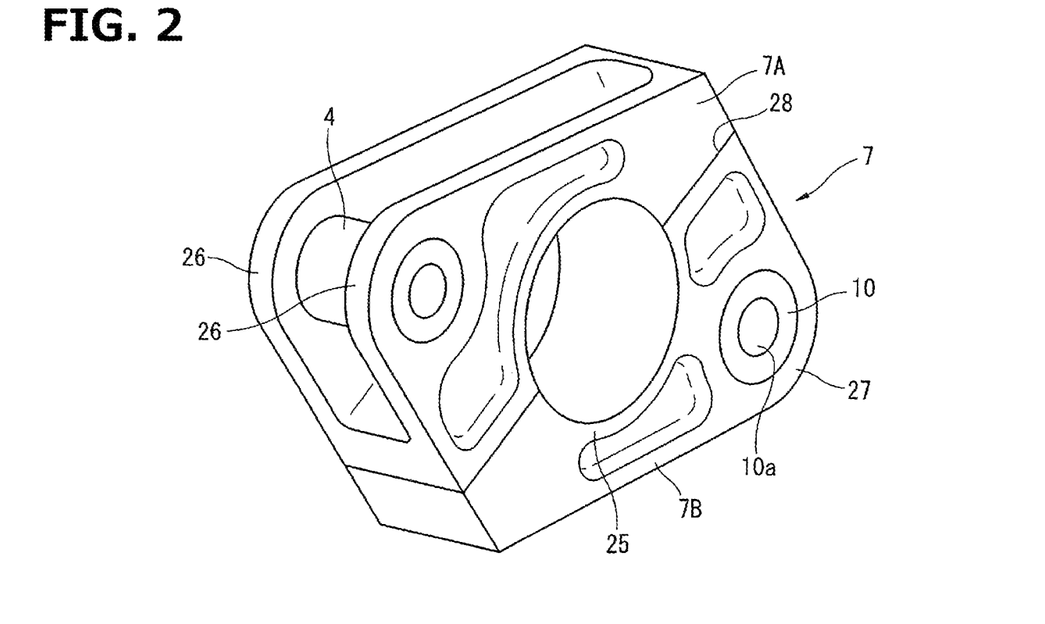
FIG. 2 is a perspective view of a lower link.
Figure 3:
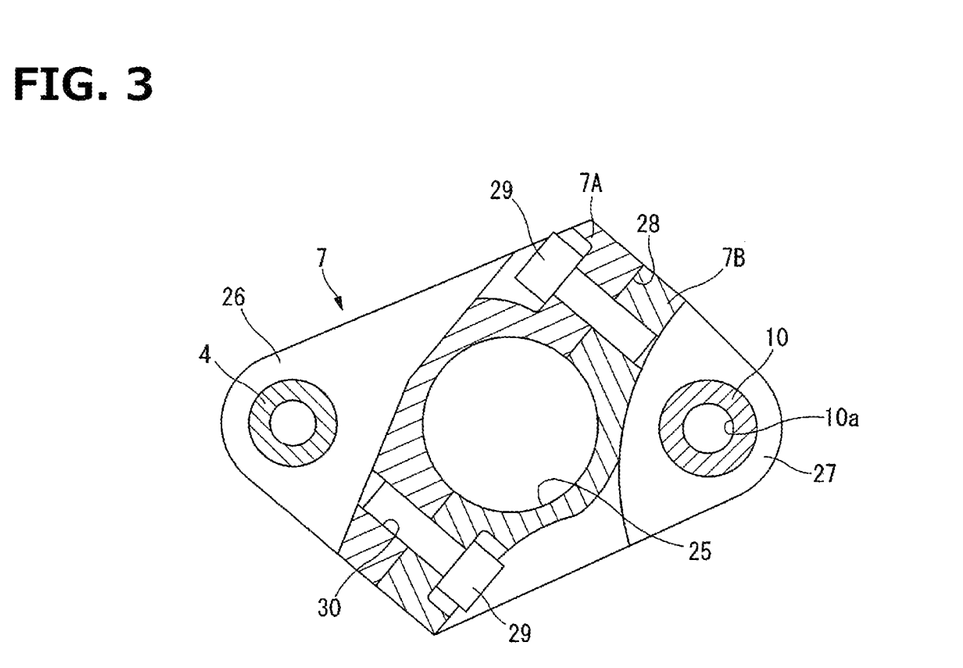
FIG. 3 is a sectional view of the lower link.

As shown in FIG. 2 and FIG. 3, respective lower links 7 have, in their centers, cylindrical crank pin bearing parts 25 fitted to respective crank pins 6, and each of pin boss portions 26 for the upper pins and each of pin boss portions 27 for the control pins are disposed at positions opposite to each other by approximately 180° relative to each of crank pin bearing parts 25. Each of these lower links 7 is formed in a parallelogram similar to a rhombus, and in a dividing surface 28 of each of lower links 7 which passes through the center of each of crank pin bearing parts 25, it is formed by being divided into two parts of an lower link upper 7A including pin boss portion 26 for the upper pin and a lower link lower 7B including pin boss portion 27 for the control pin. Each of crank pin bearing parts 25 is fitted to a corresponding one of crank pins 6, and those lower link upper 7A and lower link lower 7B of each of lower links 7 are fastened to each other by a pair of bolts 29 being inserted opposite to each other.

Next, in the present invention, a jig 31 used when lower links 7 are fitted to respective crank pins 6 of crankshaft 5 will be explained with reference to FIG. 4 and FIG. 5.

The above-mentioned fitting of lower links 7 to crank pins 6 is performed in the position in which cylinder block 11 is inverted such that the crank case 13 side in which crankshaft 5 is accommodated faces upward. In the following explanation, the terms "up" and "down" basically mean "up" and "down" in the position of FIG. 4 in which cylinder 11 is inverted. In addition, "horizontal" means a plane surface or a direction parallel to reference plane surface 21 of inverted cylinder block 11.

Jig 31 is arranged and placed on the upper surface of cylinder block 11 set to be in the inverted position, that is, on skirt parts 14 and the end edges of bulkheads 15, which become reference plane surface 21. In addition, jig 31 includes a connection base part 32 having a long narrow rectangular plate shape extending straightly in a cylinder row direction so as to be along one side of end edge 14a of each of skirt parts 14 and five comb-tooth-shaped journal support bars 33 extending from connection base part 32 along corresponding ones of the upper surfaces of the edges of bulkheads 15. Each of journal support bars 33 has an elongated bar shape, and five main journals 16 of crankshaft 5 are mounted on corresponding ones of the upper surfaces of journal support bars 33. With this, crankshaft 5 becomes a state of being lifted upward away from main bearing parts 17 of bulkheads 15, and the thickness in the vertical direction (up-and-down direction) of each of journal support bars 33 is set according to the height position of crankshaft 5 which is required for the fitting of lower links 7.

In cylinder block 11 including the multi-link-type piston crank mechanism shown in FIG. 1, connecting base part 32 is arranged on skirt parts 14 which become the control pin 10 sides of lower links 7 (right side in FIG. 1), and then it is positioned at a predetermined position to cylinder block 11 by a pair of locating pins 37. More specifically, connecting base part 32 is positioned at different predetermined positions in the width direction of cylinder block 11 between in a temporary fitting step of lower links 7 and in a final fastening step of bolts 29 which will be explained below.

A pair of positioning pins 34 is erected on the upper surface of each of journal support bars 33 for positioning mounted main journals 16 in the width direction of cylinder block 11 (longitudinal directions of journal support bars 33).

At least one side of these positioning pins 34, specifically, positioning pins 34 which are each positioned at an opening end part 33a side of each of journal support bars 33 which is opposite to the connecting base part 32 side are detachably attached to corresponding ones of journal support bars 33 by, for example, screws or being fitted to mounting holes.

Figure 4:
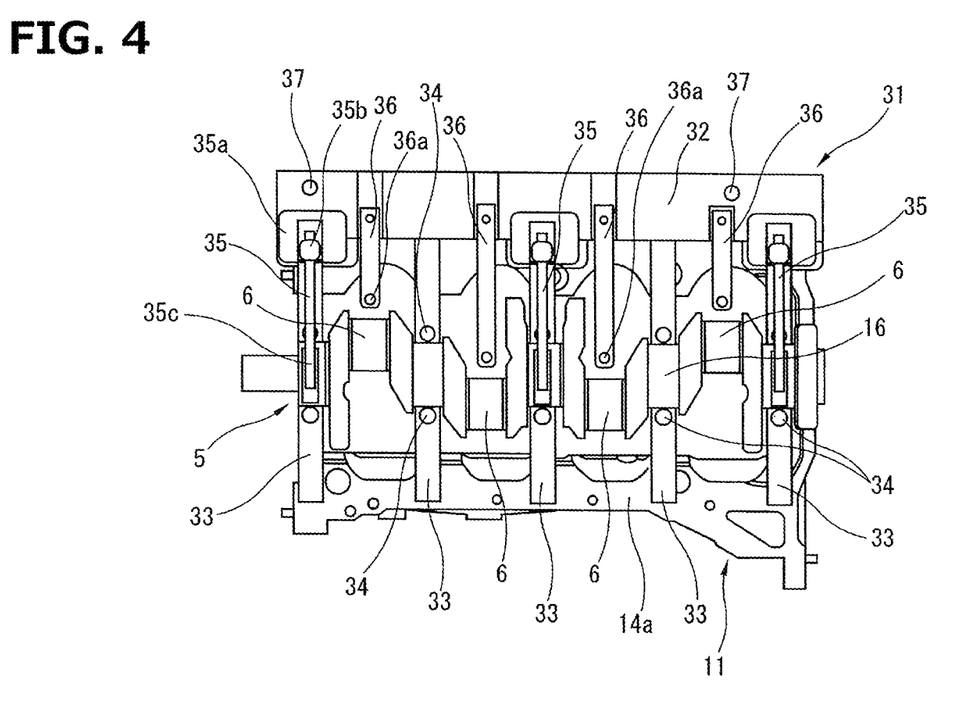
FIG. 4 is a plan view showing a jig used for this invention, with a cylinder block, etc.
Figure 5:
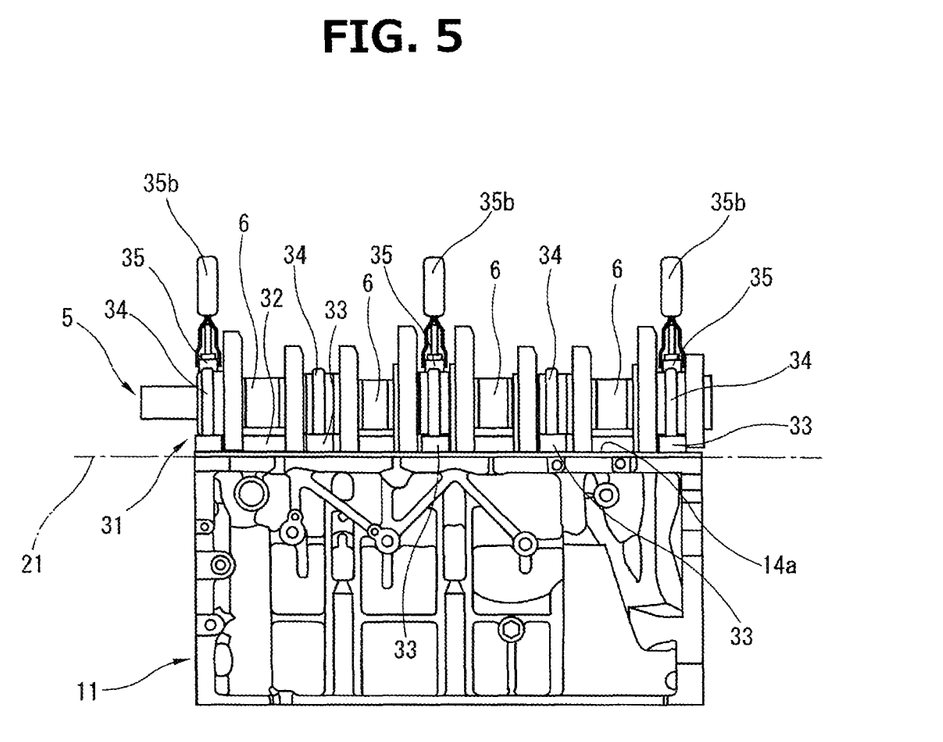
FIG. 5 is a side view also showing the jig with the cylinder block, etc.

In FIG. 4 and FIG. 5, crankshaft 5 is shown with jig 31. As is well known, in an in-line four-cylinder internal combustion engine, crank pins 6 of #1 and #4 cylinder sections are provided at positions different in phases by 180° from crank pins 6 of #2 and #3 cylinder sections. Crankshaft 5 is fixed on jig 31 such that crank pins 6 of #1 and #4 cylinder sections and crank pins 6 of #2 and #3 cylinder sections are positioned at the same height position and arranged right and left. That is, all of crank pins 6 are arranged and positioned on a plane surface (a second plane surface) parallel to reference plane surface 21 of cylinder block 11.

Journal fixing clamps 35 are disposed for fixing #1 and #5 main journals 16 at both ends and #3 main journal 16 at the middle of five main journals 16, each of which is disposed between a pair of positioning pins 34, to press them from above. Each of these journal fixing clamps 35 includes a base mount 35a fixed to the upper surface of connecting base part 32, a handle 35b which is manually operated and a substantially L-shaped crank bar 35c which turns with the operation of handle 35b, and by the operation of handle 35b, clamp bar 35c is fastened toward journal support bar 33, and thereby crankshaft 5 can be solidly fixed, including a rotation direction.

In addition, lower link temporary stop bars 36 are detachably attached to four places at connecting base part 32, and positioned corresponding to the respective positions of four crank pins 6 in crankshaft 5. Engagement pins 36a are erected on the respective upper surfaces at the distal ends of lower link temporary stop bars 36. Each of these engagement pins 36a has a diameter which is set such that each of through holes 30 (see FIG. 3) for bolts 29 of lower link uppers 7A can be engaged. Here, lower link temporary stop bars 36 for #1 and #4 cylinder sections are formed to be relatively short in correspondence with the positions of crank pins 6 of #1 and #4 cylinder sections on jig 31, and lower link temporary stop bars 36 for #2 and #3 cylinder sections are formed to be relatively long in correspondence with the positions of crank pins 6 of #2 and #3 cylinder sections on jig 31.

Next, a specific attachment method for lower links 7 will be explained by dividing it into a temporary fitting step to crank pins 6 and a final fastening step of bolts 29.

Figure 6:
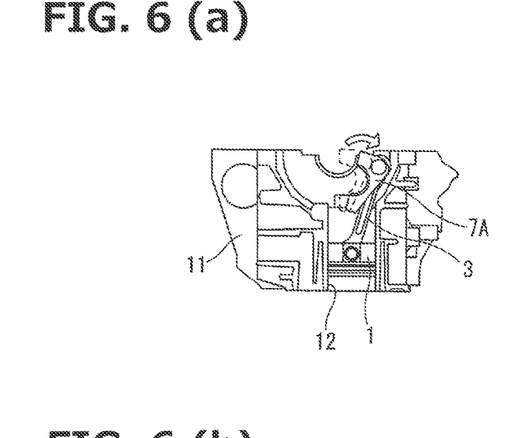
FIG. 6 is a step explanation drawing showing temporary assemble steps of the lower link.

FIG. 6 is a drawing to explain steps until lower links 7 of the respective cylinders are temporarily fitted to corresponding ones of crank pins 6 of crankshaft 5.

As shown as a step (a), before jig 31 is set to cylinder block 11 set in the inverted position, pistons 1 are inserted into respective cylinders 12 of cylinder sections. For example, it is possible to insert pistons 1 into respective cylinders 12 from a crank case 13 side, before oil jets 39 are attached to the respective side ends of bottom dead centers of cylinders 12. Each of these pistons 1 is connected with lower link upper 7A via upper link 3 in advance.

Next, as shown as a step (b), each of pistons 1 is pushed up to a predetermined position by using, for example, a hydraulic or electric push rod 41. After that, as shown as a step (c), the above-mentioned jig 31 is set on skirt parts 14 and bulkheads 15. With this, lower link temporary stop bars 36 are arranged at positions, facing to corresponding ones of cylinders 12 of the cylinder sections.

Next, as shown as a step (d), the end part at the control pin 10 side of each of upper link uppers 7A is lifted up while swinging each of upper links 3 about piston pin 2 as a center, and through holes 30 at one ends of lower link uppers 7A engage with respective engagement pins 36a at the distal ends of lower link temporary stop bars 36. With this, as shown in the drawing, each of lower link uppers 7A is held at a position in which each of half-split crank pin bearing parts 25 is opened upward and each of dividing surfaces 28 is set to be parallel (that is, parallel to reference plane surface 21). Moreover, as mentioned above, since the length of lower link temporary stop bars 36 (in other word, the positions of engagement pins 36a) for #1 and #4 cylinder sections is set in correspondence with the positions of crank pins 6 of #1 and #4 cylinder sections and the length of lower link temporary stop bars 36 for #2 and #3 cylinder sections is set in correspondence with the positions of crank pins 6 of #2 and #3 cylinder sections, by engaging lower link uppers 7A of the cylinder sections with corresponding ones of engagement pins 36a, lower link uppers 7A of #1 and #4 cylinder sections and lower link uppers 7A of #2 and #3 cylinder sections are positioned at positions corresponding to respective crank pins 6. Here, since the height position of each of pistons 1 required at this time is geometrically uniquely determined, in the step (b), each of pistons 1 is pushed up to the required height position by push rod 41.

Next, the step proceeds to a step (e), crankshaft 5 is set onto jig 31 while fitting crank pins 6 onto four lower link uppers 7A set to the above-mentioned arrangement. More specifically, by mounting crankshaft 5 onto jig 31 in the position in which crank pins 6 of #1 and #4 cylinder sections and crank pins 6 of #2 and #3 cylinder sections are arranged horizontally, crank pins 6 are naturally fitted to respective half-split crank pin bearing parts 25 of lower link uppers 7A. After that, in this state, by using journal fixing clamps 35, crankshaft 5 is fixed to jig 31.

Next, as shown as a step (1), lower link lowers 7B are connected with respective control links 8 (specifically, their main parts) in advance, and each of these lower link lowers 7B is combined to a corresponding one of lower link uppers 7A, and bolts 29 at control pin 10 sides are temporarily fasted by nut runners 43, and lower link uppers 7A are temporarily attached to respective lower link lowers 7B. At this time, since dividing surfaces 28 of respective lower links 7 are arranged horizontally, as shown in the drawing, it is possible to fasten bolts 29 from a vertical direction by nut runners 43. In addition, after one of a pair of bolts 29 of each of lower links 7 is fastened, the other of the pair of bolts 29 of each of lower links 7 may be fastened. However, it is basically enough that only one of a part of bolts 29 of each of lower links 7 is fastened, because the number of steps increases.

Accordingly, the temporary attachment of lower links 7 to crankshaft 5 is completed, and cylinder block 11 is transferred with jig 31 to a next bolt fastening stage. In addition, when the temporary attachment of the lower links 7 is completed, it is preferable that lower link temporary stop bars 36 are detached from jig 31. The fixing position of jig 31 to cylinder block 11 is changed from a first predetermined position corresponding to the temporary attachment to a second predetermined position corresponding to the bolt fastening.

Figure 7:
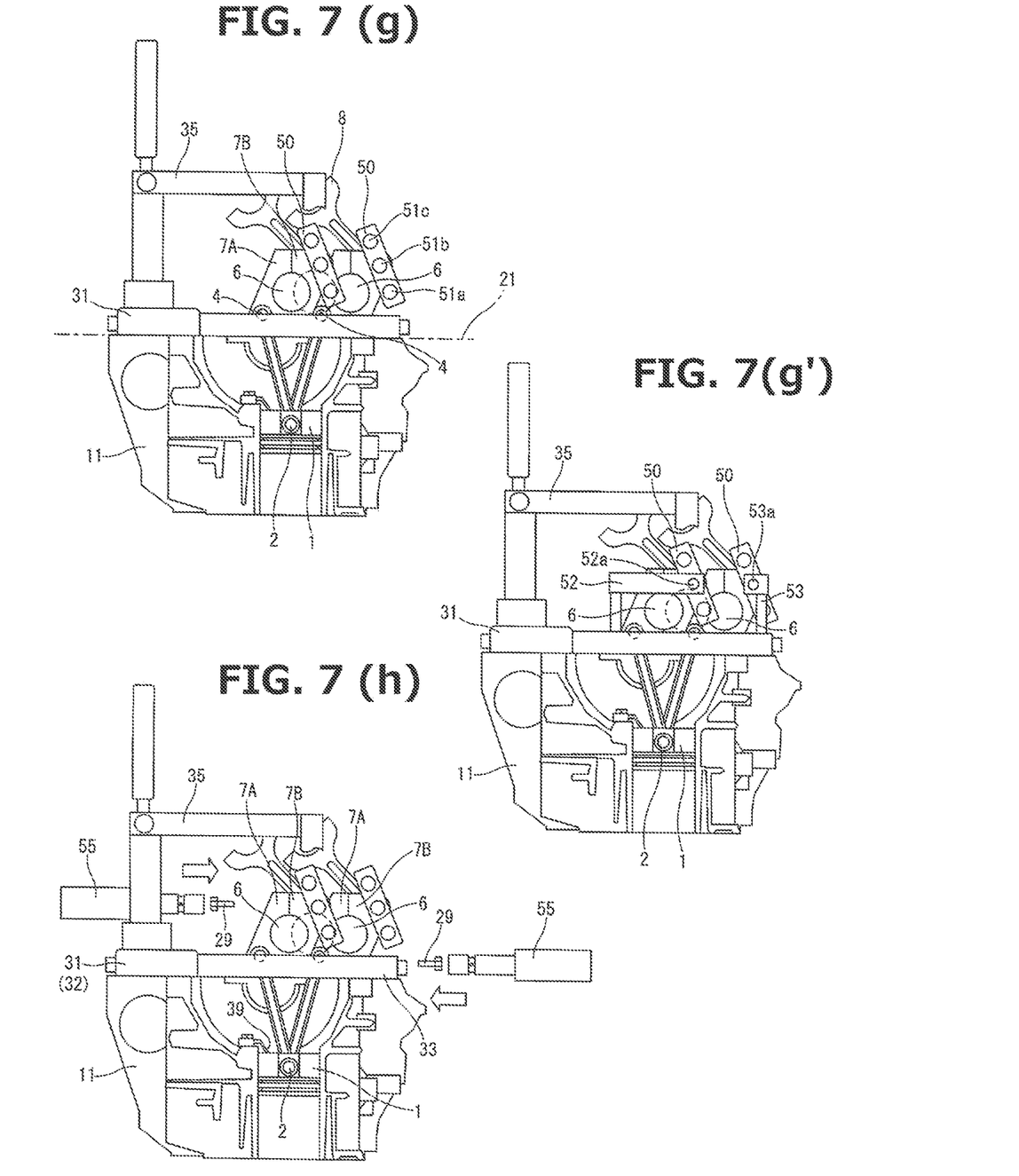
FIG. 7 is a step explanation drawing showing bolt fastening steps.

FIG. 7 is a drawing to explain steps in the bolt fastening stage in which a pair of bolts 29 disposed on each of lower links 7 so as to be arranged opposite to each other is finally fastened by a predetermined axial force.

Figure 8:
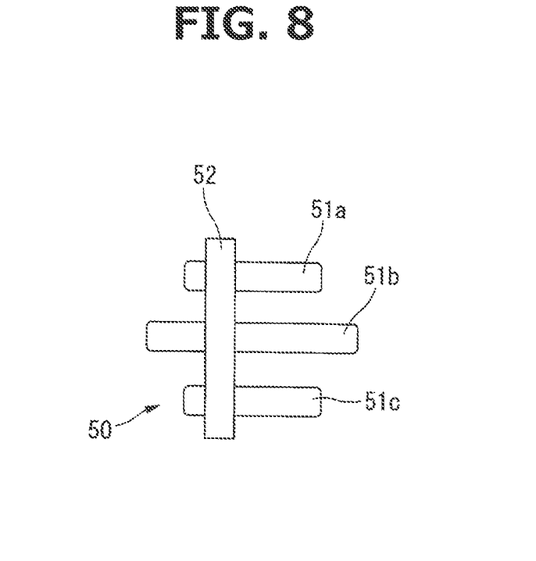
FIG. 8 is a plan view of a rotation stop jig.

As shown in a step (g), by a robot hand which is not shown in the drawings, each of lower links 7 is rotated about a corresponding one of crank pins 6 as a center up to the inclined position in which each of dividing surfaces 28 becomes vertical (a direction orthogonal to reference plane surface 21), and then held. Specifically, as shown in FIG. 8, a rotation stop jig 50 is configured by fixing three pins 51a, 51b and 51c to a long narrow plate 52, and by using rotation stop jig 50, pin 51b provided in the middle of plate 52 is inserted into middle through hole 10a of control pin 10 (see FIG. 2 and FIG. 0.3) of each of lower links 7, following which the end portion of pin 51b is grabbed by the robot hand, and is raised up to a predetermined height position. At this time, the inclination position of each of lower links 7 is uniquely determined by determining the height position of each of control pins 10, because each of crank pins 6 which becomes the rotation center of each of lower links 7 is fixed to a predetermined position. Each of rotation stop jigs 50 becomes a state of being attached to a corresponding one of control pins 10 by pin 51b at the middle of plate 52. However, two pins 51a and 51c become a state of being brought into substantially contact with both side surfaces of each of lower links 7 so as to sandwich pin boss portion 27 for the control pin, and by pin 51a, the swing of each of control links 8 (rotation in a clockwise direction in FIG. 7) is limited. That is, the unnecessary movement of control links 8 during the fastening work of bolts 29 is limited.

In addition, as shown as a step (g'), without using the robot hand, by using stands 52 and 53 which are attached to the upper surface of jig 31 by magnets, the inclined position of each of lower links 7 may be held. The above stands 52 and 53 respectively include supporting holes 52a and 53a at their upper end portions, supporting holes to which pins 51b at the middle of plates 52 of rotation stop jigs 50 are fitted, and after an operator rotates lower links 7 to predetermined positions, by fitting pins 51b of rotation stop jigs 50 into corresponding ones of supporting holes 52a and 53a, the height position of each of control pins 10 and the inclined position of each of lower links 7 are held in a predetermined state.

Here, as mentioned above, in the step (g) (or the step (g')), when each of four lower links 7 is set to the inclined position in which each of dividing surfaces 28 becomes vertical, the center axis of a pair of bolts 29 of each of lower links 7 becomes horizontal (that is, parallel to reference plane surface 21). In addition, crank pins 6 of #1 and #4 cylinder sections and crank pins 6 of #2 and #3 cylinder sections, which are different in phases by 180° from each other, are arranged right and left about corresponding ones of main journals 16 as centers so as to be horizontal to each other, that is, they are at the same height position as each other, and the center axis of a pair of bolts 29 of each of lower links 7 in all of the cylinder sections is arranged at the same height position.

At this time, an isosceles triangle is formed by three points of upper pin 4 of each of #1 and #4 cylinder sections, upper pin 4 of each of #2 and #3 cylinder sections and piston pin 2 of each of pistons 1, when viewed from a crankshaft 5 axis direction. That is, to set lower links 7 of #1 and #4-cylinder sections at the same inclined position and the same height position as lower links 7 of #2 and #3 cylinder sections, as mentioned above, it is an essential condition that an isosceles triangle is formed by three points of upper pin 4 of each of #1 and #4 cylinder sections, upper pin 4 of each of #2 and #3 cylinder sections and piston pin 2 of each of pistons 1 when viewed from the crankshaft 5 axis direction. The position of crankshaft 5 regulated by jig 31 is therefore set so as to satisfy this essential condition. In addition, when the above condition is satisfied, pistons 1 of the respective four cylinder sections are at the same height position (that is, the same stroke position).

A step (h) shows a final fastening step for bolts 29 using nut runners 55, and as shown in the drawing, by a pair of nut runners 55 arranged opposite to each other on the right and the left of each of lower links 7, a pair of bolts 29 of each of lower links 7 is fastened at the same time (or successively). A pair of nut runners 55 is horizontally arranged along the extended line of the central axis of a pair of bolts 29, and arranged at height positions different from each other, and it is possible to fasten bolts 29 by the forward and backward movements of nut runners 55 in the axial direction along the central axis of each of bolts 29. In the present invention, a pair of nut runners 55 is arranged to each of four lower links 7, and bolts 29 may be fastened by a total of eight nut runners 55 at the same time, or a pair of nut runners 55 is shifted in the axial direction of crankshaft 5, and by the pair of nut runners 55, bolts 29 of each of four lower links 7 may be fastened in order. In any method, the rotation operation of crankshaft 5 and the change operation of the positions of lower links 7 are not necessary, and a pair of bolts 29 which is inserted from directions opposite to each other can be fastened by nut runners 55 from left and right horizontal directions. As a specific fastening for axial force control, a plurality of steps are carried out in order from, for example, the application of snug torque through returning to torque zero and the application of the snug torque to the angle fastening of a predetermined angle. However, it is possible to continuously carry out a plurality of these steps while lower links 7 are each held at a predetermined position.

In addition, in the embodiment shown in the drawing, since bolts 29 which are inserted from the connecting base part 32 side of jig 31 are positioned at positions higher than the other bolts 29, nut runners 55 corresponding to the former bolts 29 are positioned at positions higher than nut runners 55 corresponding to the later bolts 29, and this is an advantage in interference avoidance with connecting base part 32.

After completing the final fastening of bolts 29, by pulling out jig 31 in the horizontal direction along reference plane surface 21, jig 31 can be removed from between cylinder block 11 and crankshaft 5. After that, as shown in FIG. 1, the attachment of main bearing caps 18 to corresponding ones of bulkheads 15, the attachment of control links 8 to control shaft 9, the attachment of sub bearing caps 19 and the like are carried out, and the assembling of the multi-link-type piston crank mechanism is completed.

As the above, although one embodiment of the present invention was explained in detail, the present invention is not limited to the above embodiment, and various modification can be possible. For example, in the above embodiment, although the central axis of a pair of bolts 29 of each of the lower links 7 is set to be horizontal and the central axis of a pair of bolts 29 of each of four lower links 7 is set so as to be at the same height, the height positions of lower links 7 of respective #1 and #4 cylinder sections may be different from those of lower links 7 of respective #2 and #3 cylinder sections while they are at the same inclined position, or the central axis of a pair of bolts 29 of each of lower links 7 may be slightly inclined with respect to reference plane surface 21. Moreover, the height position and the inclined position of each of lower links 7 may be individually different from each other. In other words, in a range in which nut runners 55 as a pair which are disposed opposite to each other on the right and the left can perform the fastening of bolts 29 without interfering with skirt parts 14 and jig 31, changes in the inclined position and the height position of each of lower links 7 are permitted. In addition, when crankshaft 5 is lifted higher, the degree of freedom in the inclination of nut runners 55 increases. However, there is a case where the movement of each of pistons 1 toward the bottom dead center side is limited due to the interference with a corresponding one of oil jets 39. As shown in the embodiment shown in the drawing, the most advantageous form is that the central axis of a pair of bolts 29 of each of four lower links 7 is at the same height and arranged horizontally, from the viewpoint of the height direction required for crankshaft 5.

In addition, in the above embodiment, although an in-line four-cylinder internal combustion engine has been explained, the present invention can be applied to other internal combustion engine types, such as an in-line six-cylinder internal combustion engine in which crankpins are spaced at intervals of 120° and a V-type six-cylinder internal combustion engine.

In addition, the present invention is not always limited to a half-skirt-type cylinder block in which the lower edge of a skirt part corresponds to the center height position of a main journal.

The invention claimed is:

1. A bolt fastening method for lower links in an internal combustion engine equipped with a multi-link piston crank mechanism including upper links, the lower links and control links, wherein each of the lower links, which is divided into two parts of a lower link lower and a lower link upper is attached so as to sandwich a corresponding one of crank pins and a pair of bolts of each of the lower links, is fastened from directions opposite to each other, and then fixed, the bolt fastening method for the lower links comprising:
   holding a cylinder block in an inverted position such that a crank case side faces upward;
   temporarily fitting the lower links of respective cylinder sections, the lower links each of which is connected with a corresponding one of pistons via a corresponding one of the upper links in advance, to the respective crank pins of corresponding ones of cylinder sections in a crankshaft in a state in which each of the pistons is fitted into a corresponding one of cylinders;
   setting the crankshaft to a state of being lifted to an upper position apart from main bearing parts of bulkheads such that all of a plurality of the crank pins having different phases from each other are each set at a position lifted upward from a reference plane surface along end edges of skirt parts of the cylinder block, in a state in which the cylinder block is held in the inverted position; and
   fastening the pair of the bolts of each of the lower links from right and left directions by nut runners in a state in which inclined positions of the lower links of the respective cylinder sections, centering the crank pins, are each held at a position in which heads of the pair of the bolts of each of the lower links are directed to right and left directions,
   wherein the lower links of the respective cylinder sections are held at a same inclined angle at which an extended line of a central axis of each of the bolts does not interfere with the skirt parts, and the bolts are fastened by the nut runners, and wherein each of the lower links is held at an inclined position in which a central axis of the pair of the bolts of each of the lower links becomes parallel to the reference plane surface.

2. The bolt fastening method for the lower links according to claim 1, wherein a jig for supporting at least two main journals of the crankshaft from below is placed on the reference plane surface of the cylinder block, and the crankshaft is held in a state of being lifted upward.

3. The bolt fastening method for the lower links according to claim 2, wherein the jig is configured to position the crankshaft at a predetermined position to the cylinder block in a vertical direction orthogonal to the reference plane surface and in right and left directions along the reference plane surface.

4. The bolt fastening method for the lower links according to claim 1, wherein the internal combustion engine is an in-line four-cylinder internal combustion engine, and in a state in which the crankshaft is lifted upward, crank pins of #1 and #4 cylinder sections and crank pins of #2 and #3 cylinder sections are arranged and positioned on a second plane surface parallel to the reference plane surface.

5. The bolt fastening method for the lower links according to claim 4, wherein a position of the crankshaft in the state of being lifted upward is set such that three points of upper pins of the #1 and #4 cylinder sections, upper pins of the #2 and #3 cylinder sections and piston pins form an isosceles triangle when viewed from a crankshaft axis direction.

6. A bolt fastening method for lower links in an internal combustion engine equipped with a multi-link piston crank mechanism including upper links, the lower links and control links, wherein each of the lower links, which is divided into two parts of a lower link lower and a lower link upper is attached so as to sandwich a corresponding one of crank pins and a pair of bolts of each of the lower links, is fastened from directions opposite to each other, and then fixed, the bolt fastening method for the lower links comprising:

holding a cylinder block in an inverted position such that a crank case side faces upward;

temporarily fitting the lower links of respective cylinder sections, the lower links each of which is connected with a corresponding one of pistons via a corresponding one of the upper links in advance, to the respective crank pins of corresponding ones of cylinder sections in a crankshaft in a state in which each of the pistons is fitted into a corresponding one of cylinders;

setting the crankshaft to a state of being lifted to an upper position apart from main bearing parts of bulkheads such that all of a plurality of the crank pins having different phases from each other are each set at a position lifted upward from a reference plane surface along end edges of skirt parts of the cylinder block, in a state in which the cylinder block is held in the inverted position; and fastening the pair of the bolts of each of the lower links from right and left directions by nut runners in a state in which inclined positions of the lower links of the respective cylinder sections, centering the crank pins, are each held at a position in which heads of the pair of the bolts of each of the lower links are directed to right and left directions, wherein the internal combustion engine is an in-line four-cylinder internal combustion engine, and in a state in which the crankshaft is lifted upward, crank pins of #1 and #4 cylinder sections and crank pins of #2 and #3 cylinder sections are arranged and positioned on a second plane surface parallel to the reference plane surface.

7. The bolt fastening method for the lower links according to claim 6, wherein the lower links of the respective cylinder sections are held at a same inclined angle at which an extended line of a central axis of each of the bolts does not interfere with the skirt parts, and the bolts are fastened by the nut runners.

8. The bolt fastening method for the lower links according to claim 7, wherein each of the lower links is held at an inclined position in which a central axis of the pair of the bolts of each of the lower links becomes parallel to the reference plane surface.

9. The bolt fastening method for the lower links according to claim 6, wherein a jig for supporting at least two main journals of the crankshaft from below is placed on the reference plane surface of the cylinder block, and the crankshaft is held in a state of being lifted upward.

10. The bolt fastening method for the lower links according to claim 9, wherein the jig is configured to position the crankshaft at a predetermined position to the cylinder block in a vertical direction orthogonal to the reference plane surface and in right and left directions along the reference plane surface.

11. The bolt fastening method for the lower links according to claim 6, wherein a position of the crankshaft in the state of being lifted upward is set such that three points of upper pins of the #1 and #4 cylinder sections, upper pins of the #2 and #3 cylinder sections and piston pins form an isosceles triangle when viewed from a crankshaft axis direction.

* * * * *